Figure 1:
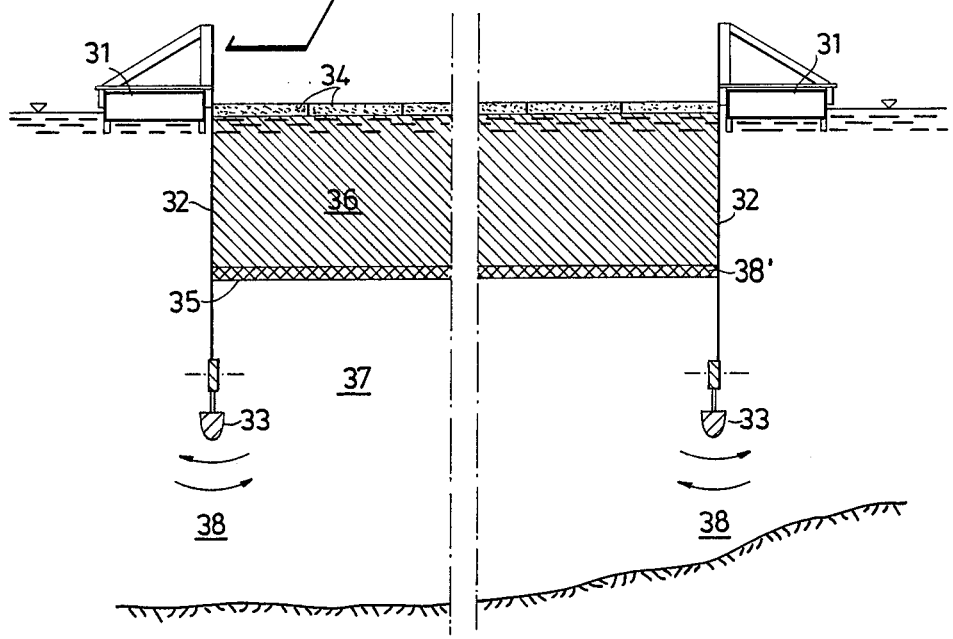

United States Patent [19]

Dunkers

[11] Patent Number: 4,735,524
[45] Date of Patent: Apr. 5, 1988

[54] METHOD AND PLANT FOR STORING FRESH WATER

[76] Inventor: Karl R. Dunkers, Hästskovägen 7, S-183 50 Täby, Sweden

[21] Appl. No.: 883,317

[22] Filed: Jul. 8, 1986

[51] Int. Cl.⁴ ............................................. E02B 3/00
[52] U.S. Cl. ..................................... 405/63; 405/60; 405/52; 405/210
[58] Field of Search .................. 405/52, 53, 210, 267, 405/270, 60, 63-72

[56] References Cited

U.S. PATENT DOCUMENTS

| | | | |
|---|---|---|---|
| 2,924,350 | 2/1960 | Greer | 405/53 X |
| 2,947,437 | 8/1960 | Greer | 405/210 X |
| 3,230,967 | 1/1966 | Castro | 405/210 X |
| 3,323,309 | 6/1967 | Dobell | 405/267 X |
| 3,380,252 | 4/1968 | Renshaw | 405/170 |
| 3,517,513 | 6/1970 | Renshaw et al. | 405/52 |
| 4,102,134 | 7/1978 | Margen | 405/53 |
| 4,326,818 | 4/1982 | Willis | 405/270 X |
| 4,335,977 | 6/1982 | Ihli | 405/52 |

Primary Examiner—Dennis L. Taylor
Attorney, Agent, or Firm—Stevens, Davis, Miller & Mosher

[57] ABSTRACT

A method and a plant for storing freshwater to distribute it as consumption water are disclosed. The freshwater is enclosed within a downwardly open tank floating in a body of salt water, e.g. seawater and defined laterally by suspended, substantially vertical curtains and at its top end at least partly by a floating cover. The freshwater is supplied to the tank adjacent its top end so as to form an upper freshwater body therein, the lower portion of the tank being taken up by the salt water. A distinct horizontal boundary layer is formed between the freshwater and the salt water bodies and will move up and down in response to supply and withdrawal of the freshwater. To restrict diffusion of salt water into the freshwater body a separating layer of material having a density intermediate those of the freshwater and the salt water may be arranged at the boundary layer.

4 Claims, 2 Drawing Sheets

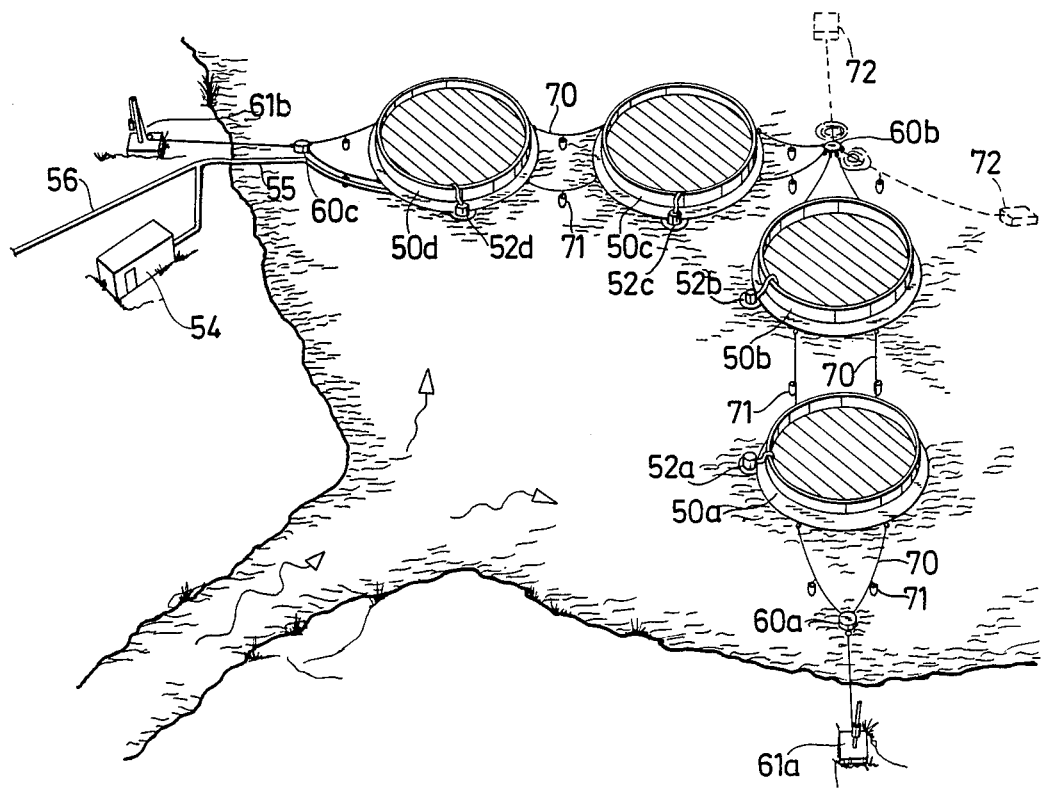

METHOD AND PLANT FOR STORING FRESH WATER

The present invention relates to water supply and treatment and more specifically to a method and a plant for storing fresh water such as collected rainwater, river water and surface water, to distribute it for use as consumption water, e.g. drinking water, household water or irrigation water.

Rainwater which is available during rainy periods ought to be a natural resource for people in all countries. This, however, requires that the rainwater be available in sufficient quantities at the right time and that it is of an acceptable quality.

Experience from different regions with different climates and terrain conditions show that it is hardly possible to continuously meet these conditions anywhere.

It is common knowledge that with regard to supply and demand, a large number of countries suffer from protracted drought. When the rain does come, the rainwater washes over run-off surfaces in large quantities, the soil layers are rapidly saturated and the water flow in streams and rivers rises with flooding as a result. The water quality is immediately deteriorated by the admixture inter alia of silt, clay, sludge, suspended substances and large quantities of bacteria. The monsoon rains pass over quickly and a new drought period rapidly comes into being. The tragedy is that only insignificant quantities of rainwater can be utilized and stored for household and irrigation purposes during the rain periods. With the present state of the art hardly any water at all can be sanitarily stored in the long term in sufficiently large and closed spaces for later use during subsequent long dry periods. The paradox in the water balance of the drought-stricken countries is either too little or disastrously too much but seldom just right.

The scarcity of water can also be a serious problem, both for industries and local government, in areas which are not normally affected by drought. Sanitary recovery of rainwater, coupled to purposeful storage would mean a welcome addition to scarce water supplies. Examples of such cases are dwellings adjacent desert areas and mountainous tracts, areas with difficult groundwater conditions, islands where salt water encroaches into rock crevices, areas with water-impenetrable soil strata or with generally prevailing lack of water, etc.

The main object of the present invention is to provide means for solving the problem of storing freshwater, e.g. in the form of collected rainwater or surface water taken from rivers, streams or shore areas. The invention is predicated on the concept of utilizing the difference in density between freshwater and salt water (sea water) for storing freshwater to be used as drinking water, household water or water for agricultural irrigation purposes.

The freshwater is enclosed within a downwardly open tank floating in the salt water and defined laterally by suspended substantially vertical plastics curtains and at its top end by a floating cover to form a protection against evaporation of freshwater. The freshwater which is supplied to the tank interior adjacent the top end thereof, so as to form an upper freshwater body therein, cannot leave the tank in a downward direction, although the tank has an open bottom, this due to the difference in density between the freshwater and the salt water.

The tank will be provided with means for supplying freshwater, which means may be of various types depending on whether it is contemplated to supply e.g. rainwater collected on ground surfaces or water from a river or stream which debouches into the sea close to the place where the tank is disposed. The tank will also be provided with means for withdrawing freshwater for consumption, e.g. as drinking water or as water for irrigation purposes. The tank, or a system of several tanks, may also be associated with a purification unit, through which the water withdrawn from the tank or a part thereof is passed before being conducted to the place of consumption, this in particular in the case of drinking water.

It is also technically possible to provide within the tank or closely adjacent the tank purification units for maintaining an acceptable water quality during long-term storage in the tank. The purifying measures which will primarily be contemplated are aeration, disinfection and filtration with associated circulation.

Between the freshwater and the subjacent salt water, a distinct boundary layer will be created due to the density differences. This layer moves slowly up or down in relation to the supply and withdrawal of the freshwater. Practical tests have established that no significant mixing of the freshwater and the salt water occurs except for a limited and very slow diffusion. Thus, the top portion of the body of water within the tank can be preserved for very long periods as a water useful for consumption purposes.

The practical tests have also established that the upwardly directed diffusion of the salt water molecules into the freshwater body may be considerably restricted—and retarded—by reducing the area of contact between the two media. This can suitably and effectively be achieved by means of a layer of floating bodies having a density which is intermediate the density of the freshwater and that of the salt water, so that they tend to sink through the freshwater body but remain floating on the surface of the salt water, i.e. at the boundary between the two different water bodies. Such floating bodies may be solid and be made from a material having a density which per se is intermediate the densities of the two liquid media, or be formed with closed cavities partly filled with air, the density of the material of the bodies and the volumes of the cavities being selected so that the average density of the floating bodies will be as desired. It is also possible to use a liquid substance having a density intermediate the densities of the two water bodies, so that it will spread as separating layer between them.

According to extensive laboratory tests carried out at the University of Lund, Sweden, the rate of diffusion of the salt water molecules (in the absence of a restricting layer) may be estimated to about 700 millimeters per year. In many countries this value corresponds to a normal annual precipitation. Accordingly the amount of rainwater supplied to the top surface of the tank in those countries will compensate the stored volume which is lost in the same period by diffusion. The boundary layer of floating bodies present between freshwater and salt water will enhance the degree of utilization of the precipitation on the tank surfaces.

Figure 2:
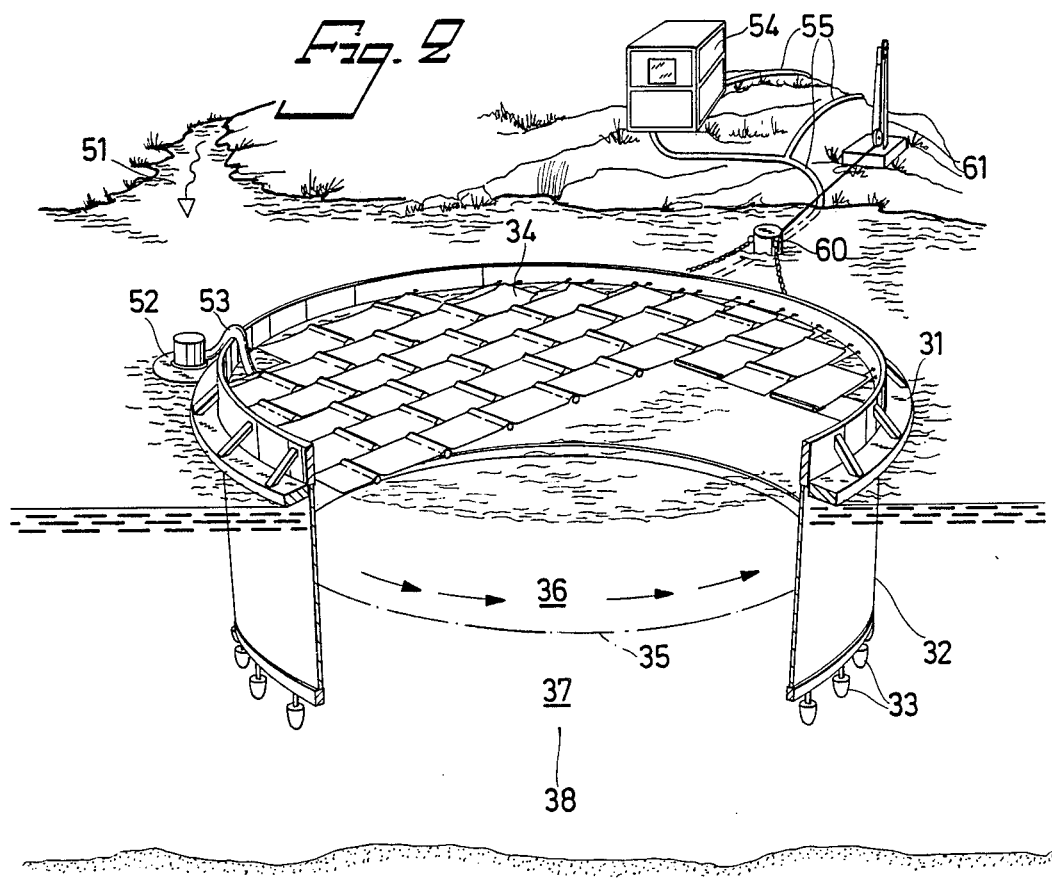

The invention will now be described in detail in conjunction with the accompanying drawings, in which:

FIGS. 1 and 2 show an example of a plant in accordance with this invention, in vertical cross-section and in partly cut-away perspective view, respectively, FIG. 3 shows another example in perspective view.

Referring to the drawings, more particularly FIGS. 1 and 2, it will be seen how the difference in density between freshwater (sweetwater, river water, surface water) and sea-water (salt water) is utilized in a floating tank or basin for storing freshwater according to the invention. FIG. 1 is a cross-sectional view illustrating a section through two basin walls facing each other. The two vertical chain lines indicate optional basin width in relation to basin depth.

The basin here consists of floating gangways or pontoons 31 on which have been mounted a continuous dependent sheet or curtain 32 kept in a stretched condition by weights 33. The lower end of the curtain terminates some distance above the sea bottom, and thus leaves an opening 38 for sea water to pass in and out from the basin area.

The surface of the basin is covered with floating elements 34, or a layer of water-permeable material which allows rainwater to percolate through, serves as a shield against the rays of the sun, prevents evaporation and functions as insulation with respect to temperature differences.

Practical attempts in a hydraulic laboratory model have shown a distinct boundary layer 35 maintaining a marked separation between the stored freshwater phase 36 above, and the salt water phase 37 below the boundary layer 35.

As described above it is possible to provide a layer of floating bodies 38' in the boundary layer in order to reduce the diffusion of the salt water molecules.

When the freshwater tap from the storage tank is greater than the supply of freshwater, removed volumes are automatically compensated by the salt water from below and the horizontal boundary layer 35 is urged upwards. The reverse takes place when an excess of freshwater is supplied, and the boundary layer 35 moves downwards. The sea water is thus utilized as a balancing medium in the volumetric changes of the stored freshwater. The position of the boundary layer can easily be checked with the aid of conductivity meters.

Due to the inexpensive basin structure, storage volumes up to tens of thousands of cubic meters can be built at reasonable cost. Of course, the surface of the basin itself is utilized as a not unimportant part of the total catchment surface area, when the unit is to be utilized largely or substantially of storing collected rainwater. Other catchment areas are arranged in adjacent shore areas from which the water is led in closed conduits out to the floating basin system. However, the major water supply will be provided by conveying freshwater from rivers, streams, canals etc. to the basin system, as shown in FIG. 2, to which reference will now be made.

FIG. 2 shows the basin structure 31 of FIG. 1 anchored by means of buoys 60 connected to a counter weight tower 61 on the shore. The basin is anchored close to the outlet of a river 51, from which water shall be collected and stored to serve as consumption water. A pump 52 is adapted to take surface water (i.e. freshwater) and introduce it into the basin through a conduit 53. It may also be possible to take water from the river 51 at a level above that of the top of the basin, so that the water may flow by gravity to the basin through a suitable conduit or channel. A purification unit building 54 is arranged on the shore and accommodates the necessary purification, means for drinking water purification such as aeration, filtration and disinfecting units. The purification installation communicates with the basin through a conduit system 55. For distribution of the water for irrigation purpose water is conveyed past the purification system to points of use through a conduit system.

FIG. 3 illustrates a similar example where several basin units 50a, 50b, 50c, 50d have been disposed in a row in the sea in the proximity of a river outlet. The basin units are connected to each other and to buoys 60a, 60b, 60c by means of wires 70 provided with weights 71. The buoys 60a, 60c are anchored to counter-weight towers 61a, 61b, and the buoy 60b is anchored to the sea bottom by anchors 72. Each basin unit is associated with a floating pump 52a, 52b, 52c, 52d for taking up surface water (i.e. freshwater) from the area outside of the basin units and for introducing it into the respective basin units. The basins are connected to each other by conduits (not shown) and a conduit system 55 connects the basin unit 50d to a purification plant 54 and to an irrigation water conduit 56.

While a number of representative embodiments have been shown and described to illustrate the inventive concept, it will be apparent to those skilled in the art that the invention is not limited thereto, but many modifications and changes are possible without departing from the spirit and scope of the invention. For example, the basins may be fixed only by means of a number of anchors, such as 72, the buoys 60 and shore anchoring mean 61 being dispensed with.

I claim:

1. A tank for storage of a confined quantity of freshwater in a large body of saltwater comprising
    an upper annular support having flotation means so that said annular support can freely float in said body of salt water, vertically supported only by said flotation means;
    a non-expandable flexible skirt of sheet material extending downwardly from said annular support to define an open-bottomed storage tank;
    means on said skirt to maintain said skirt in a generally vertical downward orientation from the annular support while said support floats in the saltwater; means for adding freshwater and removing freshwater from the top of said storage tank; a horizontal boundary layer being formed and maintained between the freshwater and the saltwater with the freshwater floating above the boundary layer and on top of the saltwater that is within the tank, said boundary layer being provided with a plurality of solid bodies having a density intermediate the density of said freshwater and the density of said saltwater, said bodies floating in the region of said boundary layer for reducing the contact area between the freshwater and the saltwater, said boundary layer being lowered as freshwater is added and the excess saltwater within the storage tank is freely displaced through said open bottom, that open bottom also permitting any particulate matter in the freshwater to settle out of the tank and into the surrounding body of saltwater.

2. The tank of claim 1 in which the means on the skirt to maintain said skirt in a generally vertical orientation is a plurality of weights secured to the lower periphery of said skirt.

3. The tank of claim 1 including cover means over the top of the container comprising a layer of floatable material or bodies so that rainwater can percolate through or between said bodies.

4. The tank as claimed in claim 1, comprising a water treatment unit communicating with said tank to enable freshwater to be transferred to said treatment unit for treatment.

* * * * *